June 20, 1950     J. G. BOOTH     2,511,897
INDUCTANCE DEVICE

Filed Aug. 31, 1946     2 Sheets-Sheet 1

INVENTOR.
JOHN G. BOOTH
BY Arthur H. Swanson
ATTORNEY.

June 20, 1950  J. G. BOOTH  2,511,897
INDUCTANCE DEVICE
Filed Aug. 31, 1946  2 Sheets-Sheet 2

INVENTOR.
JOHN G. BOOTH
BY
Arthur H. Swanson
ATTORNEY.

Patented June 20, 1950

2,511,897

UNITED STATES PATENT OFFICE 2,511,897

INDUCTANCE DEVICE

John G. Booth, Philadelphia, Pa., assignor, by mesne assignments, to Minneapolis-Honeywell Regulator Company, Minneapolis, Minn., a corporation of Delaware Application August 31, 1946, Serial No. 694,344

6 Claims. (Cl. 175—356)

The present invention relates to electric coil devices, and particularly to the structure of and method of forming an inductance device comprising a pair of inductance elements which are assembled into an inductance device comprising two flat, coaxial, spirally wound coils at opposite sides of a space receiving a metallic plate or vane which is movable in said space to vary the mutual inductance of the two coils.

The general object of the present invention is to provide an improved inductance device of the above mentioned type and suitable for use in control systems, such as those disclosed in the application of William H. Wannamaker, Serial No. 541,575, filed June 22, 1944, including an electronic valve and associated means through which the valve is caused to oscillate or not to oscillate by variations in the mutual inductance of the inductance device.

The commercial production and also the use of such inductance devices present practical difficulties because of the small size and the fragile and easily deformable character of the inductance coils, and the necessity for accurately spacing cooperating coils with respect to one another and to the vane-receiving space between them. The accurate formation and disposition of such a device and its component parts are essential to their practical use, and a primary object of the present invention is to provide improvements in the structure and in the method of producing inductive devices and their component parts, contributing to accuracy in the form of such devices and in the disposition of their coils.

More specific objects of the invention are to provide inductance coil structures characterized by their sturdy character, and by the relatively small breakage or scrap loss in their production, assemblage and use. A further specific object of the invention is to provide a method of construction minimizing risk of injury or distortion of the delicate portions of the coil structure in the process of producing the coils.

The various features of novelty which characterize my invention are pointed out with particularity in the claims annexed to, and forming a part of this specification. For a better understanding of the invention, however, its advantages, and specific objects attained by its use, reference should be had to the accompanying drawing and descriptive matter in which I have illustrated and described a preferred embodiment of the invention.

Figure 1:
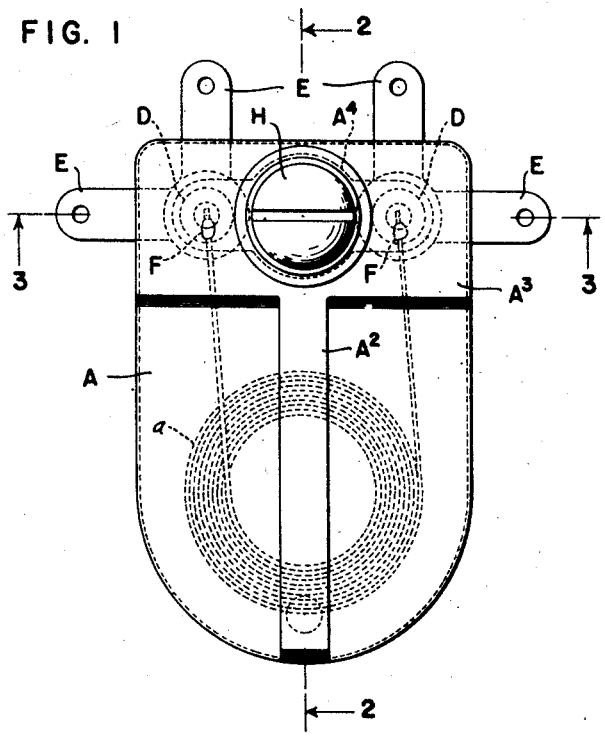
Fig. 1 is a plan view of an inductance device.

In the drawings, and referring first to Figs. 1, 2, 3 and 4, A represents one, and B represents the other of two generally similar main elements of an inductance structure, which comprises a spiral coil $a$ incorporated in the element A and a spiral coil $b$ incorporated in the element B. The coils $a$ and $b$ may be counterparts, but in the particular inductance structure shown, the coil $a$ includes nine and half convolutions, and the coil $b$ includes seven and a half convolutions. The element A is a coherent plastic body incorporating the coil $a$ and parts C, D, E and F associated therewith to form the coil unit shown in Figs. 7 and 8. Said coil unit is inserted in the mold in which the unit is incorporated in the plastic body in the formation of the latter by a molding operation hereinafter described. The body A has one flat side A' in juxtaposed relation to the corresponding flat side B' of the element B. The flat sides A' and B' are spaced away from one another to provide a kerf-like vane space G. As shown, the element A is formed with stiffening ribs $A^2$ and $A^3$, and with a hub-like, elongated key projection portion $A^4$ which surrounds a passage extending through the portion of the device at the closed end of the space G to receive a bolt H for clamping the parts A and B together.

As mentioned above, the element A is formed with an elongated key projection $A^4$ which is received, and fits snugly, in a key socket $B^4$ formed in the element B, so as to accurately position the elements A and B relative to one another when they are clamped together. As shown, also, the element B is provided at its end remote from the key socket $B^4$, with a key $B^5$ for positioning the element relative to the structure of a control instrument in which it may be mounted. The elements A and B are substantially counterparts of one another, except as they differ in the shape of their interlocking and positioning parts, and except as their respective coils $a$ and $b$ differ in the number of their turns.

Figure 7:
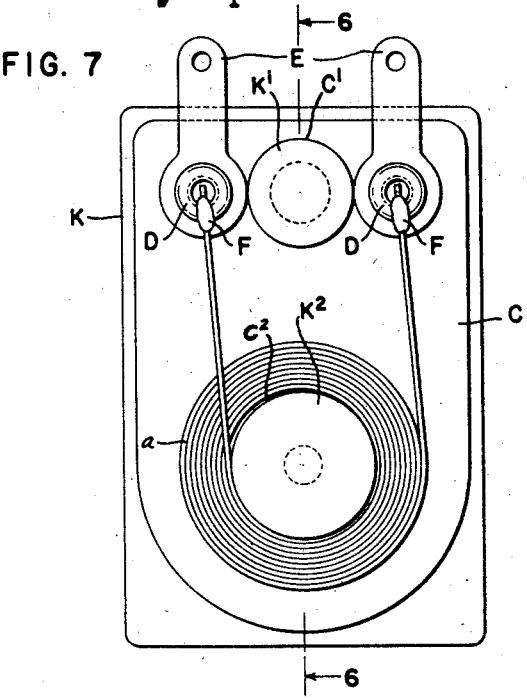
Fig. 7 is an elevation of a fixture used in the production of a coil unit with the latter in place on said fixture.
Figure 8:
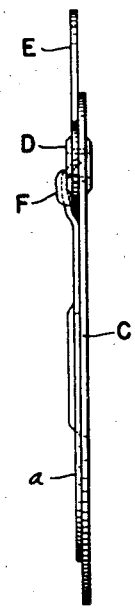
Fig. 8 is an elevation of the coil unit shown in Fig. 7.

In the preferred form of construction illustrated, each of the elements A and B is a molded body of plastic material, ordinarily a resinous compound, in which is incorporated a coil unit assembly, one form of which is shown in Figs. 7 and 8. That unit comprises a coil support C in the form of a sheet or plate of fibrous material, preferably paper, which is impregnated with resinous material and is formed with positioning apertures C' and C². The aperture C' forms part of the passage for the clamping bolt H in the assembled inductance device. Special positioning purposes of the apertures C' and C² are described later. The parts C may be stamped or punched from a web of paper or other fibrous material. The coil a or b included in each unit has its central opening similar in diameter to, and in register with, the aperture C² in the supporting part C. A pair of sheet metal terminal parts E are secured to each part C by tubular rivets or eyelets D each having a body portion extending through the part C, and through an aperture formed in an enlarged end of the corresponding terminal E. Each eyelet has upset or outturned flange end portions between which the part C and corresponding terminal E are clamped. The end portions of the fine wire forming the corresponding coil a or b, extend tangentially away from the inner and outer convolutions of the coil into overlapping relation with the enlarged ends of the corresponding terminal members E. Each wire end is connected by solder F to the corresponding eyelet D and terminal member E. To facilitate the connection of the parts into a control circuit, the two terminal parts E of each inductance unit A extend away from one end of the element and are parallel with one another, while the terminals E of each element B extend in opposite directions away from the opposite sides of the element. Advantageously, and as shown, the body portions of the eyelets D of each element extend through apertures formed for the purpose in the support C at opposite sides of the aperture C'.

Figure 5:
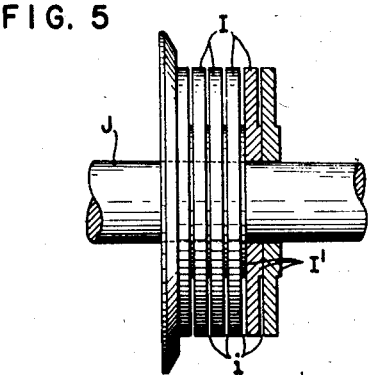
Fig. 5 is an elevation of a mandrel structure used in winding the individual coils.

In the preferred mode of forming the coils a and b, each is wound to its predetermined form on a mandrel, which as shown in Fig. 5, comprises a shaft J and a series of washer-like parts I mounted on said shaft. Each washer has one flat side and its opposite side comprises a flat annular outer portion surrounding a cylindrical, hub-like projection I'. When the washers I are assembled on the shaft J, their hub-like portions are all directed in the same direction, so that each projection spaces the surrounding portion of the side of the washer including the hub away from the flat side of the adjacent washer. This provides an annular space i between the two washers in which the coil a or b may be wound. The axial extent of each annular space i is only great enough to receive the convolutions of a single spiral coil and the end portion of the wire extending tangentially away from the inner convolution of the coil. After being wound, each coil is coated with varnish to give the coil wire an insulation coating, and to give the coil the form stability needed in the immediately following steps in the manufacture of the corresponding inductance element.

Figure 6:
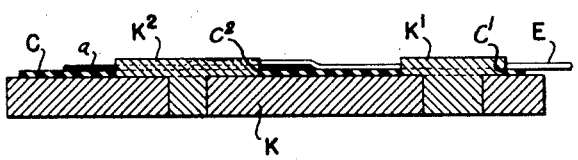
Fig. 6 is a section on the line 6—6 of Fig. 7.

Those steps include the placing of each coil in the position shown in Fig. 7 on the corresponding coil supporting flat part C which has previously had its terminal parts E connected to it by eyelets D. With the coil properly positioned on its support C, each end portion of the coil wire is trimmed, if necessary, and is then rigidly attached to the corresponding eyelet D and terminal part E by solder F. The coil unit parts are then varnished and baked to permanently attach the body and end portions of the coil to the support C. Advantageously, the support C is supported during the baking operation on the fixture K shown in Figs. 6 and 7. The fixture K is in the form of a plate-like body of metal having projections K' and K² from one side, which extend through and fit snugly in the apertures C¹ and C² formed in the coil support C, placed on the aperture. As will be apparent, the fixture K may also serve as a convenient jig to support the flat part C and to center thereon the body of the coil a or b in attaching the latter to the support C preliminary to the baking operation. Preferably the projections K' and K² comprise shoulder pins or removable studs to facilitate removal of the support C and the attached coils a or b after completion of the baking operation.

Figure 2:
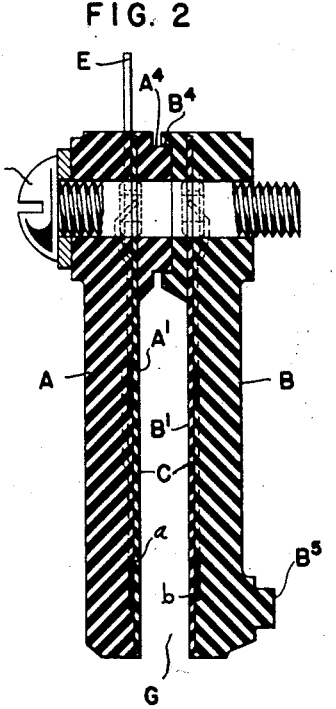
Fig. 2 is a section on the line 2—2 of Fig. 1.
Figure 3:
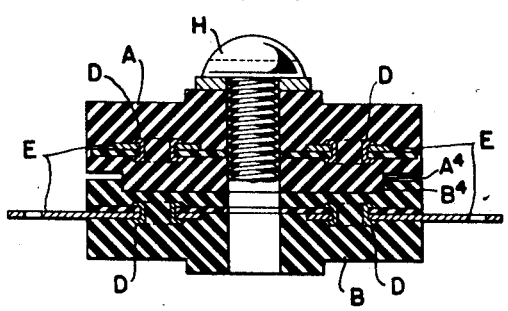
Fig. 3 is a section on the line 3—3 of Fig. 1.
Figure 4:
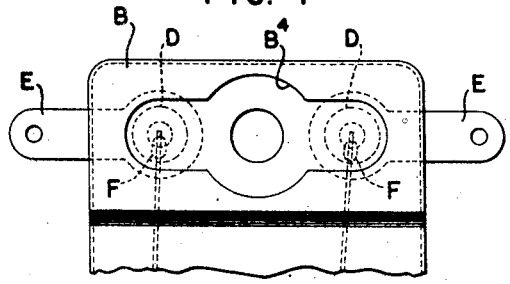
Fig. 4 is a plan view of a portion of the device shown in Figs. 1–3.
Figure 9:
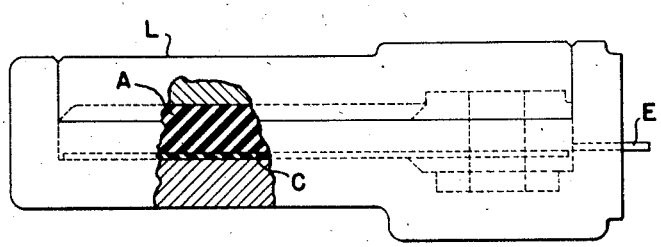
Fig. 9 is a view partly in section of a mold used in the formation of an inductance device component.

Following the baking operation, each coil support and the necessary amount of resinous plastic material are placed in the mold L of Fig. 9, after which the plastic material is pressed into shape and baked, thereby completing the formation of that inductance element, which includes a laminar portion adjacent the flat side, A' or B', of the body and formed by the corresponding support C. As is shown in Fig. 2, the flat portion of each element A or B adjacent the vane receiving kerf G of the inductance unit of which the element forms a part, is formed by the side of the coil support C to which the corresponding coil a or b is not attached. This means, of course, that in the mold L, the side of the part C remote from the coil which it supports, bears against a flat portion of the mold cavity wall. With the supporting part C so disposed in the mold, the molding pressure cannot distort or displace the body portion of the coil. In consequence, the coils a and b of each inductance unit are properly spaced relative to one another and to the adjacent sides of the kerf G in the assembled inductance unit shown in Fig. 2.

While the dimensions of the inductance unit and its component parts may vary with the conditions of use, it is noted by way of illustration and example, that in the form and design shown in the drawings, the coil a comprises 9½, and the coil b comprises 7½ convolutions or turns of No. 31, B & S gauge, copper wire. That wire is less than .009" in diameter. The inside diameter of the inner convolution of each coil, i. e., the diameter of the projection K² of the fixture K, is ⅜". The maximum width of each element A and B is about ⅞". The space G between the faces A' and B' of the assembled inductance device is ⅛" thick. Notwithstanding their small dimensions and the fineness of the coil wire, the finished elements A and B are sturdy and easily handled parts and are subject to relatively minute breakage and scrap loss in production, assembly and use. By the selection of a suitable resinous molding compound, water absorption and resultant humidity effects on the control circuit in which the elements are to be used may be suitably minimized. The plastic molding material also provides excellent insulation for the individual coils a and b and their terminal leads. Ordinarily, the body parts A and B are formed in separate molds which may have the conventional characteristics of the molds used in molding resinous plastic material and which differ from one another only in the shape of the mold cavity walls defining the interlocking portions of the parts A and B. While the convolutions of the coils a and b may well be of substantially true spiral form as shown, in some cases the convolutions may be elliptical or rectangular or of some other special form. Preferably in all cases, however, the coils have the common characteristic that each consists of a series of convolutions progressively increasing in size and in that each convolution of larger size surrounds the convolutions of smaller size, so that each convolution may similarly engage a flat surface at one side of the coil.

While, in accordance with the provisions of the statutes, I have illustrated and described the best form of embodiment of my invention now known to me, it will be apparent to those skilled in the art that changes may be made in the form of the appartus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. An inductance element comprising a flat sheet of fibrous material, a flat coil of fine wire parallel to and mounted on said sheet and comprising convolutions of progressively increasing size with each convolution of larger size surrounding the convolutions of smaller size, and a rigid mass of resinous material substantially thicker than said coil in contact with said coil and with the side of said sheet at which the coil is located and united to said sheet by a resinous plastic bond.

2. An inductance element comprising a flat sheet of fibrous material impregnated with a resinous material, a flat coil of fine wire parallel to and mounted on said sheet and comprising convolutions of progressively increasing size with each convolution of larger size surrounding the convolutions of smaller size, and a rigid mass of resinous material substantially thicker than said coil in contact with said coil and with the side of said sheet at which the coil is located and united to said sheet by a resinous plastic bond.

3. An inductance element comprising a flat sheet of fibrous material, a flat fine wire coil comprising a plurality of convolutions of progressively increasing size with each convolution of larger size surrounding the convolutions of smaller size and having its convolutions alongside and in contact with said sheet, and a rigid coherent mass of resinous plastic material substantially thicker than said coil and bonded to the latter and to the side of said sheet with which said coil is in contact.

4. An inductance device comprising two juxtaposed elements each including a flat sheet of fibrous material, a flat coil of fine wire parallel to and mounted on said sheet and comprising convolutions of progressively increasing size with each convolution of larger size surrounding the convolutions of smaller size, and a rigid mass of resinous material substantially thicker than said coil in contact with the latter and with the side of said sheet at which the coil is located and united to said sheet by a resinous plastic bond, and connecting structure engaging said elements, and holding them in such positions fixed relative to one another that the two sheet portions are parallel and face one another and are spaced apart and form the opposing side walls of a kerf-like space, whereby the mutual inductance of said coils may be varied by changes in position of a metallic element extending into said space.

5. An inductance structure comprising in combination two juxtaposed coil elements each comprising a coherent body of plastic material and a flat fine wire coil embedded therein and having a portion of its side adjacent the other element shaped to form an outside wall of a kerf-like space having its sides between and defined by the two elements and extending from one end of the element toward its opposite end and having another portion of said side shaped to form a mating portion at said opposite end of said space, the mating portion of each element having a surface portion parallel to the sides of said space and in abutting relation with a parallel mating surface portion of the other element, and having other surface portions transverse to one another and to the sides of said space and each alongside and in engagement with a transverse surface portion of the other element, whereby said mating portions interlock and maintain the side walls of said space in predetermined relation to one another when said parallel surface portions are secured in abutting relation, and clamping means comprising portions respectively engaging the two elements and securing the latter together with their parallel surface portions in abutting relation, said space being open at all points along the edge of each element, except at its said opposite end, and the said flat wire coil imbedded in each element comprising convolutions of progressively increasing size with each convolution of larger size surrounding the convolutions of smaller size and being separated from said space by a relatively thin flat portion of the element and being interposed between said thin portion and a substantially thicker portion of the element more remote from said space than said thin portion.

6. An inductance structure as specified in claim 5, in which each element is formed with a transverse passage extending through its mating surface in register with the corresponding passage through the other element, said clamping means comprising a clamping bolt extending through the registering passages and securing said elements together with their mating surfaces in engagement.

JOHN G. BOOTH.

REFERENCES CITED

The following references are of record in the file of this patent:

UNITED STATES PATENTS

| Number | Name | Date |
| --- | --- | --- |
| 1,445,242 | Shackelton | Feb. 13, 1923 |
| 1,581,162 | Boucher | Apr. 20, 1926 |
| 1,666,120 | Currier | Apr. 17, 1928 |
| 1,854,031 | Hewlett | Apr. 12, 1932 |
| 2,137,392 | Cobb | Nov. 22, 1938 |
| 2,141,890 | Weis | Dec. 27, 1938 |
| 2,177,260 | Laube | Oct. 24, 1939 |
| 2,291,670 | Wiley et al. | Aug. 4, 1942 |
| 2,319,537 | Delmonte | May 18, 1943 |